April 23, 1940.    H. W. KOST    2,198,439
FASTENING DEVICE
Filed Dec. 31, 1938
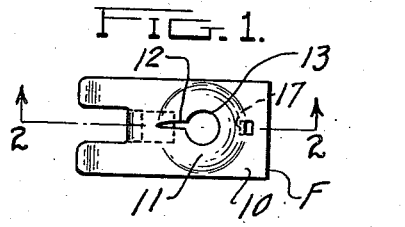
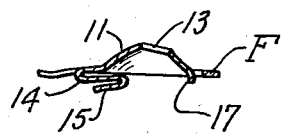
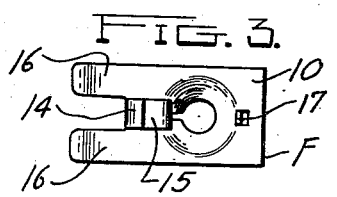
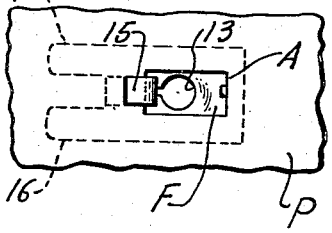
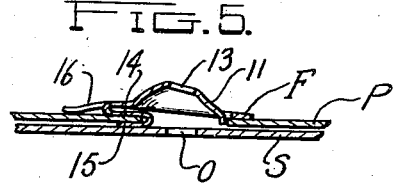
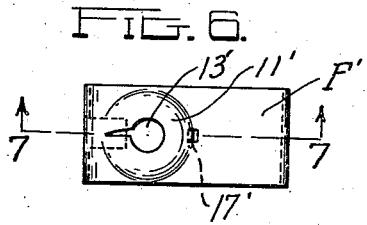
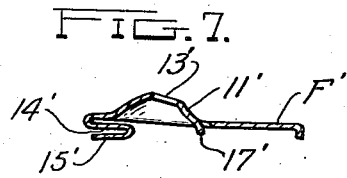
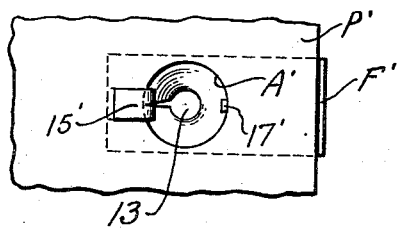
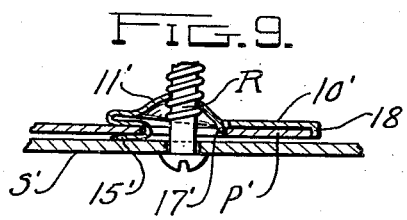
Inventor
Harold W. Kost
By Malcolm W. Fraser
Attorney Patented Apr. 23, 1940

2,198,439

UNITED STATES PATENT OFFICE 2,198,439

FASTENING DEVICE

Harold W. Kost, Birmingham, Mich., assignor to Prestole Devices, Inc., Detroit, Mich., a corporation of Michigan Application December 31, 1938, Serial No. 248,731

9 Claims. (Cl. 85—32)

This invention relates to devices for securing together superposed sheets, such as sheet metal panels, but more particularly to fasteners which can be applied to a hole in a sheet panel in such manner that they will be held against displacement.

An object of the invention is to produce a new and improved fastener of the above character which can be readily applied, inexpensively manufactured on a production basis, is simple in construction and sturdy and reliable for the purpose intended.

Other objects of the invention reside in details of construction, arrangement and assembly more particularly described hereinafter and for purposes of illustration but not of limitation, embodiments of the invention are shown on the accompanying drawing in which.

Figure 1 is a top plan view of a fastener embodying my invention;

Figure 2 is a vertical sectional elevation substantially on the line 2—2 of Figure 1;

Figure 3 is a bottom plan view of the fastener shown in Figure 1;

Figure 4 is a bottom plan view of a fastener applied to a panel provided with a rectangular aperture;

Figure 5 is a vertical sectional elevation of the fastener applied to a panel and with another panel juxtaposed thereto in position to be secured in place;

Figure 6 is a top plan view of another form of fastener for use particularly with panels formed with round apertures;

Figure 7 is a vertical sectional elevation on the line 7—7 of Figure 6;

Figure 8 is a bottom plan view of the fastener applied to a panel provided with a round aperture; and Figure 9 is a vertical sectional elevation showing the fastener applied to a panel and a screw connecting another sheet member in position.

The illustrated embodiment of the invention shown in Figures 1 to 5 comprises a fastener F adapted to be applied to a panel P formed with a rectangular aperture A in which case it is not necessary to provide additional means for holding the fastener against turning movements upon the application of a screw. The fastener F comprises a sheet metal body 10 formed with a substantially frusto-conical protuberance 11 deformed from the body 10 and being generally of concavo-convex form as indicated on Figure 2. The metal of the protuberance is slit as indicated at 12 and formed in the outer end of the protuberance is an opening 13, the edge wall of which is in the form of a helix adapted to receive a screw-threaded member such as a screw. The form of the protuberance and the helically disposed edge wall is more fully described in my co-pending application, Serial No. 246,694, filed December 19, 1938, to which reference is here made.

At one end of the body 10 a strip of metal is severed therefrom and is folded upon itself to form an inwardly extending portion 14. The end portion of the strip is then folded outwardly upon the portion 14 to provide a fold 15, thereby to provide a hook which faces or opens toward the adjacent end of the body. A portion of the fold is disposed directly beneath a portion of the protuberance 11. On each side of the hook member formed by the above described folds is a finger 16, the end portion of which curves downwardly and outwardly to bear against the outer side of the panel P, as shown in Figure 5.

On the other side of the protuberance 11 and juxtaposed to the base thereof is a downwardly and inwardly inclined tongue 17 which is relatively short and is struck out of the body 10. The tongue 17 is directly opposed to the above described hook member and is preferably spaced from the bite of the hook member a distance approximating that of the length of the aperture A.

In use, the fastener is applied inclinedly to the aperture A by first engaging the sides 14 and 15 of the hook upon opposite sides of the panel P at the edge of the aperture A and then moving the fastener longitudinally of the opening to force the hook over the panel edge until the tongue 17 can snap downwardly into the aperture and thereby frictionally engage an edge of the aperture opposite to that edge portion engaged by the hook. The fastener is thus securely held in position. In order to disengage the same from the panel P, one end of the fastener may be pried up to free the tongue 17 from the panel P whereupon the fastener may be slid longitudinally and upwardly to disengage the hook therefrom.

When the fastener F is in position upon the panel P, a sheet S having an opening O may be brought into engagement with the underside of the panel so that the aperture O is substantially in line with the opening 13 in the protuberance. A screw is inserted from the outside of the panel S and threaded into engagement with the helical wall of the opening 13 thereby to secure the parts together. In view of the rectangular shape of the aperture A, it will be apparent that the fastener will not turn when the screw is tightened.

The form of the fastener shown on Figures 6 to 9 is similar to that above described but is intended for use with a panel P' having a round aperture A'. In this form the fastener F" is formed with a similar frusto-conical protuberance 11' having an opening 13' the wall of which is in the form of a helix. At one side of the protuberance an extension of the body of the fastener is bent into the form of a hook having sides 15' and 14' similar to that above described. However, in this form the fingers 16 are not employed. On the other side of the protuberance 11' a tongue 17' similar to that above desccribed is formed. The hook engages an edge of the aperture A' and the tongue 17' engages an opposite edge of the aperture, as above described.

On the same side of the protuberance 11' as the tongue 17' the body portion 10' is somewhat extended to project slightly beyond the end of the panel P' to which the fastener is applied and at the extreme end of the body 10' is a downturned flange 18 which engages the end of the panel P'. The flange 18 cooperates with the end of the panel P' to hold the fastener from turning movements.

As indicated in Figure 9, a sheet S' formed with a suitable aperture is applied against the panel P' and a headed screw R extends through the openings in the sheet S', panel P' and threadedly engages the helical wall of the protuberance thereby to secure the parts together.

A fastener of the above construction is particularly advantageous in blind locations since it can be readily applied to the panel and is held against displacement while another part is brought into the desired position of assembly to receive the usual fastening screw.

It is to be understood that numerous changes in details of construction, arrangement and operation may be effected without departing from the spirit of the invention especially as defined in the appended claims.

What I claim is:

1. A fastener for an apertured panel comprising a flat sheet metal body, a thread engaging portion in said body, an integral hook on one side of said portion adapted to extend into the aperture for engaging opposite sides of the panel, said hook being arranged at one side of said portion and spaced inwardly from an end of the body and disposed between the sides thereof thereby to provide a pair of fingers engageable with the outer side of the panel, and a tongue integral with said body on the other side of said portion to extend into the aperture for engaging a side thereof remote from that portion embraced by said hook.

2. A fastener for an apertured panel comprising a sheet metal body, a thread engaging protuberance deformed from the body and including a helical portion spaced entirely from the plane of the body, a hook on one side of said protuberance formed by bending the metal inwardly upon itself and then outwardly upon itself to provide a hook opening toward the adjacent end of the body, a spring finger on opposite sides of said hook extending outwardly therefrom and adapted to engage the adjacent side of said panel, and a tongue on the other side of said protuberance struck from the body and spaced from the inner end of said hook a distance equal approximately to one dimension of the aperture.

3. The combination with a panel having a rectangular aperture of a fastener therefor, said fastener having a sheet metal body, a thread engaging portion on said body, a hook integral with said body for engaging opposite sides of the panel at an edge of the aperture, fingers on opposite sides of said hook extending outwardly therefrom for engaging the adjacent side of said panel, and a tongue struck from said body to engage an opposite edge of said aperture.

4. A fastener for an apertured panel comprising a sheet metal body, a thread engaging protuberance deformed from the body and including a helical portion spaced entirely from the plane of the body, a hook on one side of said protuberance formed by bending the metal inwardly upon itself and then outwardly upon itself to provide a hook opening toward the adjacent end of the body, a tongue on the other side of said protuberance struck from the body and spaced from the inner end of said hook a distance equal approximately to one dimension of the aperture, and a flange on said body adapted to engage an end edge of the panel to restrain the fastener from turning.

5. A fastener for an apertured panel comprising a sheet metal body, a thread engaging protuberance deformed from the body and including a helical portion spaced entirely from the plane of the body, a hook on one side of said protuberance formed by bending the metal inwardly upon itself and then outwardly upon itself to provide a hook opening toward the adjacent end of the body, a tongue on the other side of said protuberance struck from the body and spaced from the inner end of said hook a distance equal approximately to one dimension of the aperture, and means separate from said tongue and hook on said body for restraining the fastener from turning.

6. The combination with a panel having a round aperture adjacent an end edge thereof, of a fastener therefor, said fastener having a sheet metal body, a thread engaging portion on said body, a hook on one side of said portion for engaging opposite sides of the panel at an edge of the aperture, a tongue struck from said body on the other side of said portion to engage an opposite edge of the aperture, and a flange on said body engaging said end edge of the panel to restrain the fastener from turning.

7. A fastener for an apertured panel comprising a substantially flat sheet metal body, a thread engaging portion projecting from one face of said body including a substantially frusto-conical protuberance provided with a central opening, the edge of said opening being in the form of a helix to receive the thread of a screw, a resilient hook integral with said body and disposed at one side of said protuberance, said hook projecting from the opposite face of the body and extending laterally of and then parallel with same in superimposed relation thereto, and a relatively short prong-like tongue on the opposite side of said protuberance projecting laterally of said body and from the same side as said hook, whereby the body is adapted to lie flat against one face of the panel with the thread receiving opening in alignment with the panel aperture and with said hook engaging the other face of the panel and with said tongue in snap engagement with the wall of the panel aperture at a point opposite to that portion engaged by the hook.

8. A fastener for an apertured panel comprising a substantially flat sheet metal body, a thread engaging portion projecting from one face of said body including a substantially frusto-conical protuberance provided with a central opening, the edge of said opening being in the form of a helix to receive the thread of a screw, a resilient hook integral with said body and disposed at one side of said protuberance, said hook projecting from the opposite face of the body and extending laterally of and then parallel with same in superimposed relation thereto, and a relatively short prong-like tongue on the opposite side of said protuberance projecting laterally of said body and struck therefrom at the base of said protuberance and from the same side as said hook, whereby the body is adapted to lie flat against one face of the panel with the thread receiving opening in alignment with the panel aperture and with said hook engaging the other face of the panel and with said tongue in snap engagement with the wall of the panel aperture at a point opposite to that portion engaged by the hook.

9. A fastener for an apertured panel comprising a substantially flat sheet metal body, a thread engaging portion projecting from one face of said body including a substantially frusto-conical protuberance provided with a central opening, the edge of said opening being in the form of a helix to receive the thread of a screw, a resilient hook integral with said body and disposed at one side of said protuberance, said hook projecting from the opposite face of the body and extending laterally of and then parallel with same in superimposed relation thereto, an integral resilient finger substantially co-extensive with the face of the panel opposite to that engaged by said hook, and a relatively short prong-like tongue on the opposite side of said protuberance projecting laterally of said body and from the same side as said hook, whereby the body is adapted to lie flat against one face of the panel with the thread receiving opening in alignment with the panel aperture and with said hook engaging the other face of the panel and with said tongue in snap engagement with the wall of the panel aperture at a point opposite to that portion engaged by the hook.

HAROLD W. KOST.